July 21, 1942.
P. G. HOLT
2,290,187
AIR TURBINE SPEED CONTROLLING DEVICE
Filed Aug. 14, 1941
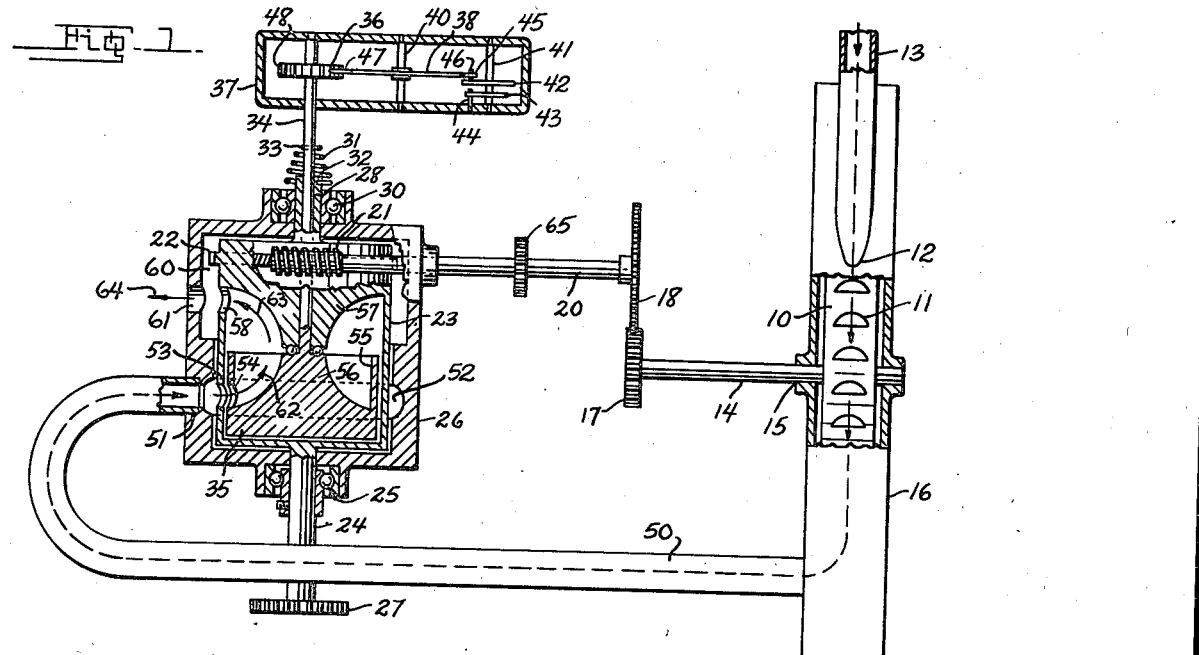
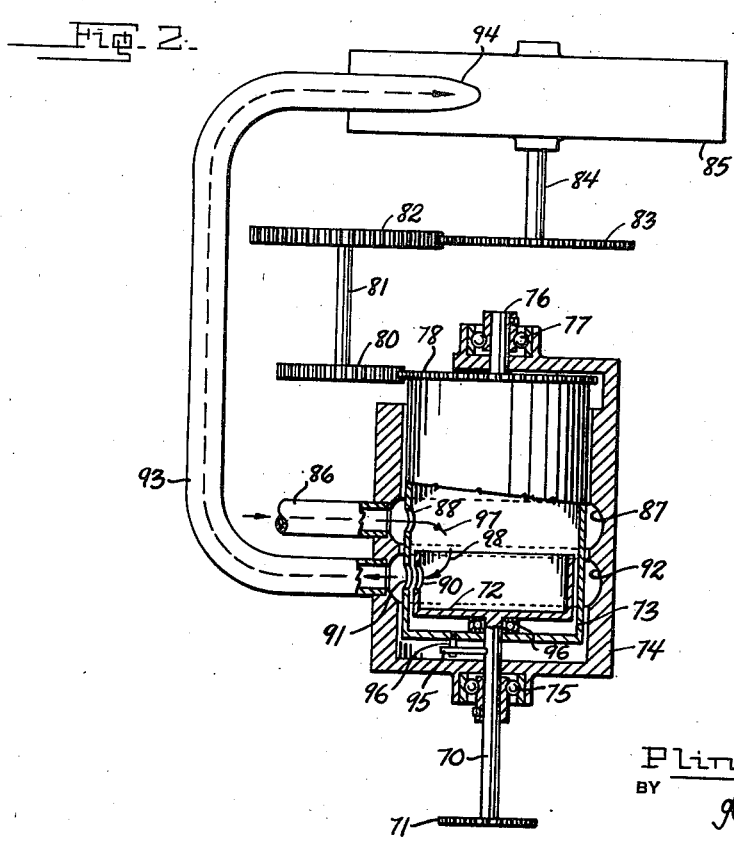
INVENTOR
Pliny G. Holt
BY
K O Calder
ATTORNEY Patented July 21, 1942

2,290,187

UNITED STATES PATENT OFFICE 2,290,187

AIR TURBINE SPEED CONTROLLING DEVICE

Pliny G. Holt, United States Navy

Application August 14, 1941, Serial No. 406,923

4 Claims. (Cl. 137—158)

(Granted under the act of March 3, 1883, as amended April 30, 1928; 370 O. G. 757)

This invention relates to an air turbine speed controlling device and has for an object to provide an air turbine whose air driven turbine wheels will rotate at a predetermined speed, which predetermined speed may either be constant, in one form of the invention, or may be at a predetermined ratio to the speed of rotation of a shaft rotating under low power from an outside source in another form of the invention.

A further object of this invention is to provide a means for controlling the speed of an air driven turbine wheel, which means may be used in various devices, one example of such use being a turn indicator for aircraft.

A further object of this invention is to provide an air turbine whose speed will vary greatly with changes in the air supply to the turbine or with changes in load on the turbine axis.

A further object of this invention is to provide a means for inicreasing the power available from the low power control shaft without affecting the speed of the shaft.

With the foregoing and other objects in view, the invention consists in the construction, combination and arrangement of parts hereinafter described and illustrated in the drawing, in which:

Fig. 1 is a partly sectional, partly elevational view of one form of the invention in which the turbine wheel is driven at a constant speed; and Fig. 2 is a similar view of another form of the invention in which the speed of the turbine wheel is in constant or fixed ratio to the speed of a low power shaft driven from an outside source of power.

Referring to the form of the invention shown in Fig. 1, there is shown at 10 a turbine wheel having impeller blades 11 driven by a jet of air coming from nozzle 12 at the end of a pipe 13 receiving air pressure from a suitable source, such as from a scoop mounted in the air stream of an aircraft. The turbine wheel 10 is fixed on a shaft 14 journaled at 15 in the turbine casing 16. A gear 17 on the end shaft 14 is in mesh with a gear 18 on one end of another shaft 20, the other end of the shaft 20 having a worm 21 mounted thereon. In mesh with the worm 21 is a worm gear 22 mounted on a hollow drum 23. This hollow drum 23 has a shaft 24 journaled in a bearing 25 in the drum casing 26 and a gear 27 at the end of the shaft 24 provides a power take-off therefrom. Axially aligned with shaft 24 is a second but hollow shaft 28 journaled through the bearing 30 in the drum casing 26. A hairspring 31 anchored at one end 32 to the hollow shaft 28 has its other end 33 anchored to a shaft 34. This shaft 34 extends through the hollow shaft 28 and hollow drum 23 and is secured to or part of the half drum 35.

Fixed on the shaft 34 adjacent its other end is an escapement wheel 36 within a housing 37. Likewise located within this housing 37 is an escapement fork 38 journaled on a shaft 40. Another journal shaft 41 within the housing 37 is provided with a balance wheel 42. Anchored at one end to the pivot shaft 41 of balance wheel 42 is a hairspring 43 whose other end is secured to an anchoring pin 44 in the housing 37. The rate of rotation of the escapement wheel 36 is controlled in the conventional manner by the stiffness of the hairspring 43 on balance wheel 42 through the fork 38 with the usual rocker fingers 45 extending to opposite sides of the escapement wheel pin 46 and the bifurcated fork fingers 47 cooperating with the escapement wheel teeth 48. As the hollow shaft 28 is rotated, the hairspring 31, which in effect is like the main spring of a watch, rotates the shaft 34 to thus rotate the half drum 35 along with the hollow drum 23, the escapement wheel 36 and balance wheel 42 keeping the rate of rotation of shaft 34 and a half drum 35 substantially constant for, as well known in the use of escapements for timepieces, the magnitude of the torque acting on the driving shaft 34 has very little effect on the rate of the escapement so long as there is sufficient torque to keep the escapement operating. The speed of the shaft 34 is therefore limited by the rate of the escapement and as long as the turbine wheel 10 receives sufficient power to drive the hollow shaft 28 at a speed greater than the limiting speed of the shaft 34, a torque will be maintained by the main hairspring 31 on the shaft 34. In order to keep the speed of shaft 34 from becoming excessive the relative motion of hollow shaft 28 and shaft 34 is used to control what is in effect an air valve, this air valve including the hollow drum 23 to which hollow shaft 28 is connected and the half drum 35 to which shaft 34 is connected.

The air that has operated the turbine blades 11 is conducted by a pipe 50 from the turbine casing 16 through an opening 51 in the drum casing 26. The opening 51 in casing 26 leads to an inner circumferential groove 52 within the drum casing 26. Opposite this groove 52 the hollow drum 23 is provided with an opening 53, while the half drum 35 is provided with a correspondingly placed opening 54 which extends through its cylindrical lip 55. Commencing at the lower edge of the opening 54, which is also the lower edge of the cylindrical lip 55, the half drum 35 is shaped like one-half of an hour-glass at 56, while the interior of the hollow drum 23 is shaped like the other half of the hour-glass as at 57. Adjacent the outermost portion of the hour-glass section 57, the hollow drum 23 is provided with a second opening 58 leading to a space 60, while an opening 61 connects the space 60 to the atmosphere.

In operation, as the turbine wheel 10 is turned by the air pressure coming through pipe 13, it rotates the worm 21 and thus the hollow drum 23 with its hollow shaft 28 and, through main hairspring 31 and shaft 34 it also rotates half drum 35. Escapement wheel 48 controls the rate of rotation of shaft 34 and thus of half drum 35. As long as the air from the turbine casing 16 through pipe 50 and groove 52 may pass through aligned holes 53 in hollow drum 23 and hole 54 in half drum 35, the turbine will be rotated at a constant speed. Should the speed of the turbine become excessive the hollow shaft 28 will tend to speed up faster than the escapement allows shaft 34 and half drum 35 to rotate, tending to twist main hairspring 31 as it does so.

Such displacement of the hollow drum 23 and half drum 35 relative to each other starts to move their openings 53 and 54 out of alignment, thus, cutting down or cutting off the air that will escape thereto and follow the arrows 62 and 63 to the atmosphere at 64. This creates a back pressure in groove 52 and thus through pipe 50 in turbine casing 16, slowing down the rotation of the turbine wheel 10, and diminishing the torque on the hollow drum 23. With such diminished torque, the main hairspring 31 acting on hollow shaft 28 tends to untwist and restore the hollow drum 23 to the position where holes 53 and 54 are again sufficiently aligned to keep the rotation of the hollow drum 23 in constant balance with the rotation of the half drum 35 as permitted by the escapement wheel 36. If the turbine tends to slow down for any reason, the reverse action takes place, thus opening the valve by bringing holes 53 and 54 more nearly into alignment, allowing more pressure to leave the turbine, thus increasing its speed. With the turbine thus operating, power may be taken off gear wheel 27 which is rotating at a constant rate. If desired, power may also be taken off gear wheel 65 on shaft 20 whose rotation is likewise constant.

In the form of the invention shown in Fig. 2, instead of using an escapement to control the air valve and thus control the rate at which the turbine wheel may turn, a rotating shaft is used, which shaft may be rotated at a very low power from an outside source, where the speed of such shaft must not be affected appreciably by any added mechanism. This outside low power shaft is shown at 70 having at one end a gear 71 connected to the outside power source, while its other end is connected to a half drum 72 within a hollow drum 73 which in turn is within a drum casing 74. The shaft 70 is journaled through a bearing 75 in drum casing 74 and a bearing 76 in hollow drum 73. The hollow drum 73 is further journaled on an axially aligned stub shaft 76 in a bearing 77 of drum casing 74. A gear 78 on the hollow drum 73 connects through a gear train consisting of gear 80, shaft 81, gear 82 meshing with gear 83 on a turbine shaft 84, extending within the turbine casing 85, to a turbine wheel therewithin. The air pressure for operating the turbine wheel with the casing 85 comes through pipe 86 from a suitable source of air pressure to an interior circumferential groove 87 in the drum casing 74. The hollow drum 73 is provided with an opening 88 opposite this groove so that the air may pass from the groove through the opening 88 and through an opening 90 in the half drum 72 to a second opening 91 in the hollow drum 73. From the second opening 91 the air passes through a second internal circumferential groove 92 through a pipe 93 terminating in a nozzle 94 through the turbine casing 85 to operate the turbine wheel therewithin.

An arm 95 on shaft 70, which may be spring mounted thereon if desired, tends to abut against a leg 96 on hollow drum 73 so long as drum openings 90 and 91 are in alignment permitting air to pass therethrough in the direction of the arrows 97 and 98 from the source of pressure air pipe 86 to the turbine air pipe 93. If desired, of course, arm 95 may be mounted in a manner to permit over-running in case the shaft 70 is suddenly stopped for any reason.

In operation of this form, air pressure from the source to the pipe 86 passes freely through the hollow drum and half drum as long as the holes are aligned through pipe 93 to operate the turbine within the casing 85. Should the turbine shaft 84 have too much speed it will change the relative position of the hollow drum 73 to the half drum 72, bringing the holes 90 and 91 somewhat out of alignment, thus cutting down the amount of air pressure that passes through pipe 93 to the turbine and thus reduces the speed of the turbine until the holes are again aligned. If the turbine shaft speed becomes too slow, the holes would come into more accurate alignment, permitting more pressure to thus increase the turbine speed.

Other modifications and changes in the number and arrangement of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

1. An air turbine speed controlling device comprising in combination with an air turbine, an air conduit means through which the air pressure passes for operating said turbine, means in said air conduit for varying the air flow to the air turbine inversely whenever the speed of the turbine varies from a predetermined constant, said means comprising an air valve including one rotatable valve element whose rate of rotation is directly controlled by the turbine and a second valve element, and means for controlling the rate of rotation of said second valve element at a predetermined substantially constant rate.

2. An air turbine speed controlling device comprising in combination with an air turbine, an air conduit means through which the air pressure passes for operating said turbine, air valve means in said air conduit for diminishing the air-flow to the air turbine when the rate of rotation of the air turbine exceeds a predetermined substantially constant rate, said air valve means including one rotatable valve element whose rate of rotation is directly controlled by the turbine and a second valve element, and means for controlling the rate of rotation of said second valve element.

3. An air turbine speed controlling device comprising in combination with an air turbine, an air conduit means through which the air pressure passes for operating said turbine, air valve means in said air conduit for diminishing the air-flow to the air turbine when the rate of rotation of the air turbine exceeds a predetermined substantially constant rate, said air valve including one rotatable valve element whose rate of rotation is directly controlled by the turbine and a second valve element, and means for controlling the rate of rotation of said second valve element, said second valve element rate controlling means including an escapement means.

4. An air turbine speed controlling device comprising in combination with an air turbine, an air conduit means through which the air pressure passes for operating said turbine, air valve means in said air conduit for diminishing the air-flow to the air turbine when the substantially constant rate of rotation of the air turbine exceeds a predetermined rate, said air valve including one rotatable valve element whose rate of rotation is directly controlled by the turbine and a second valve element, and means for controlling the rate of rotation of said second valve element, said second valve element controlling means including an outside power means.

PLINY G. HOLT.